May 29, 1928.

R. E. WEINERT 1,671,499

MACHINE FOR CUTTING IRREGULAR SHAPES

Filed June 21, 1926   4 Sheets-Sheet 1

INVENTOR
Roland Edward Weinert
BY
Pennie Davis Marvin & Edmonds
ATTORNEYS

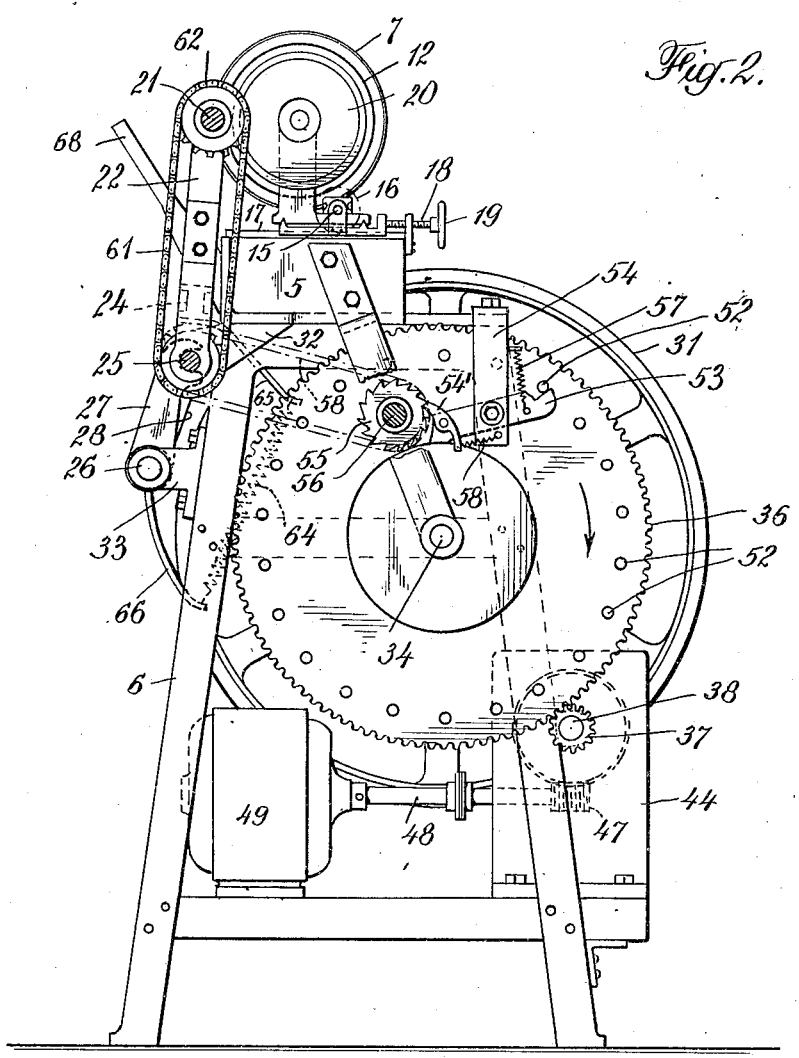

May 29, 1928.
R. E. WEINERT
1,671,499
MACHINE FOR CUTTING IRREGULAR SHAPES
Filed June 21, 1926 4 Sheets-Sheet 3
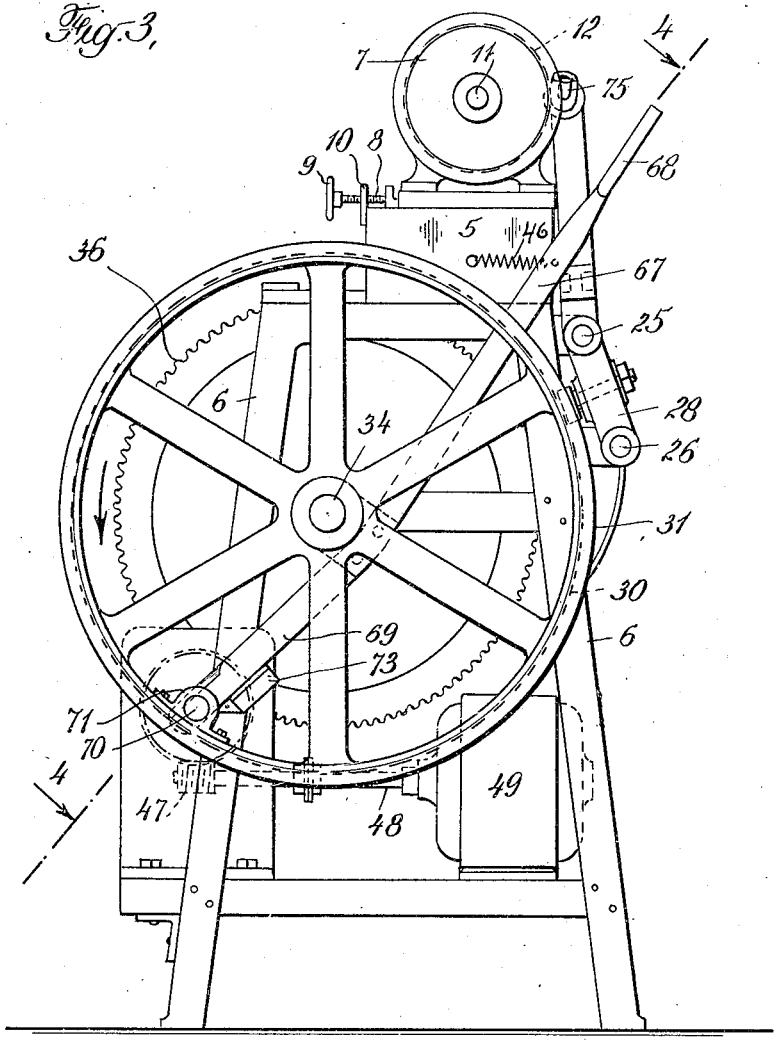
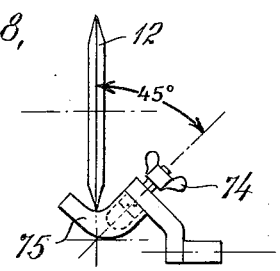
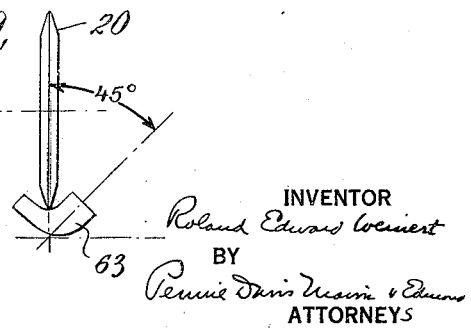
INVENTOR
Roland Edward Weinert
BY
Pennie Davis Marvin & Edmonds
ATTORNEYS May 29, 1928.  
R. E. WEINERT  
1,671,499  
MACHINE FOR CUTTING IRREGULAR SHAPES  
Filed June 21, 1926  
4 Sheets-Sheet 4
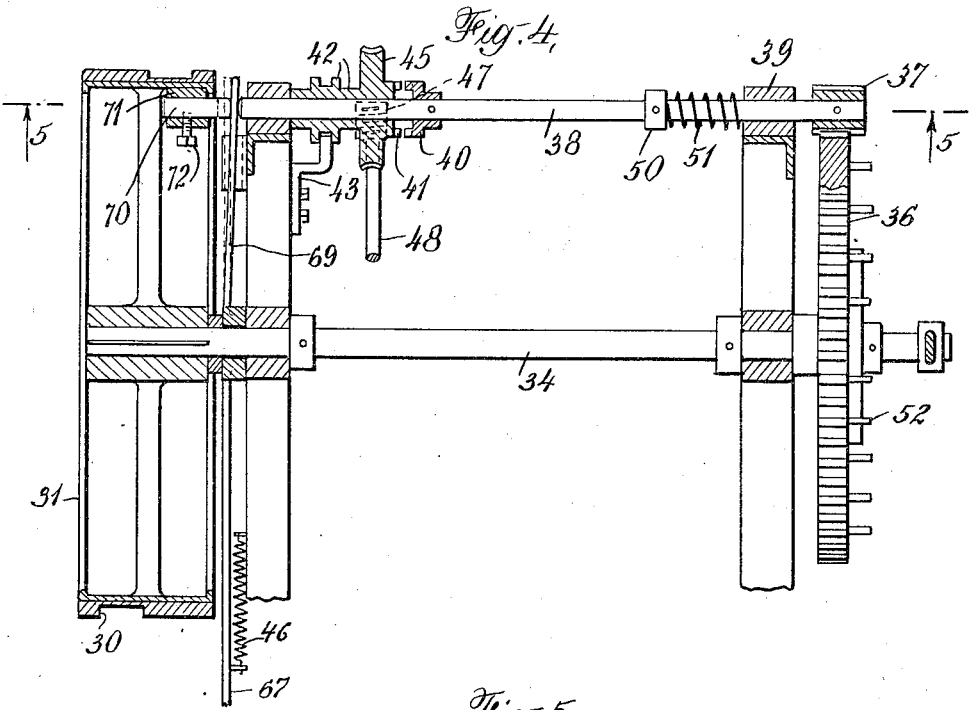
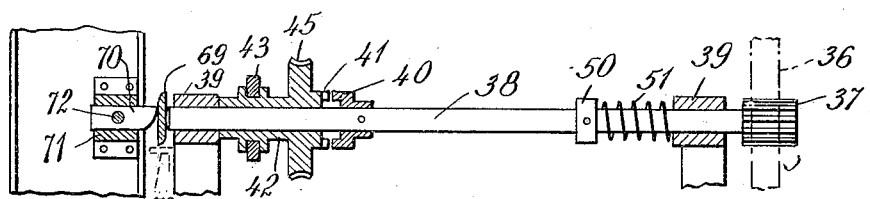
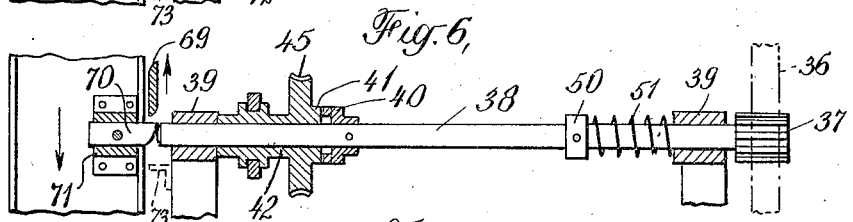
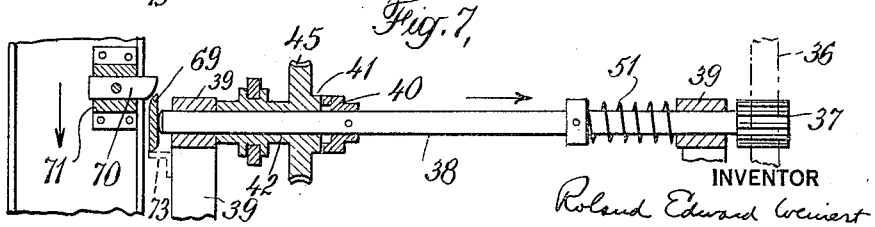
INVENTOR  
Roland Edward Weinert  
BY  
Pennie Davis Marvin & Edmonds  
ATTORNEYS Patented May 29, 1928.

1,671,499

UNITED STATES PATENT OFFICE.

ROLAND EDWARD WEINERT, OF JAMAICA, NEW YORK, ASSIGNOR TO WM. DEMUTH & CO., OF NEW YORK, N. Y., A CORPORATION OF NEW YORK.

MACHINE FOR CUTTING IRREGULAR SHAPES.

Application filed June 21, 1926. Serial No. 117,265.

This invention relates to machines for cutting articles of irregular shape such as tobacco pipes from wood and similar materials, and particularly to a machine which is adapted to perform all of the necessary operations automatically.

Attempts have been made heretofore to shape tobacco pipes in machines and one machine which has been used successfully consists of a rotating cutting wheel and an arbor having a chuck to hold the wooden block and a model adapted to bear against a fixed guide forming a counterpart of the cutting wheel. In the operation of this machine the rough block is fixed in the chuck and the arbor is moved toward the cutting wheel while the model is held in engagement with the guide. At the conclusion of the stroke the arbor is withdrawn and rotated slightly and is again advanced to bring the block into engagement with the cutting wheel. This machine, being manually operated except for the driving of the cutting wheel, require the entire attention of an operator who must be sufficiently skillful to guide the operation by the "feel" of the contact between the cutting wheel and the wood block. The necessary skill is acquired only after extended practice and with the consequent loss of a considerable quantity of material resulting from defective operation.

It is the object of the present invention to provide an automatic machine capable of cutting a pipe bowl, for example, from a block without attention from the operator other than that of removing and replacing the bowls and blocks.

A further object of the invention is the provision of a machine more especially for cutting pipe bowls in which the angular position of the chuck with reference to the plane of the cutting wheel is such as to ensure a smooth and satisfactory operation.

Other objects and advantages of the invention will be apparent as it is better understood by reference to the following specification and accompanying drawing in which the preferred embodiment of the machine is described and illustrated. In the drawing, Fig. 1 is a side elevation of a machine;

Fig. 2 is a section on the line 2—2 of Fig. 1;

Fig. 3 is an end elevation of the machine;

Fig. 4 is a section on the line 4—4 of Fig. 3;

Figs. 5, 6 and 7 are details in section on the line 5—5 of Fig. 4; and

Figs. 8 and 9 are details in elevation indicating the preferred angularity of the chuck and model with reference to the plane of the cutting wheel and guide respectively.

Figure 1:
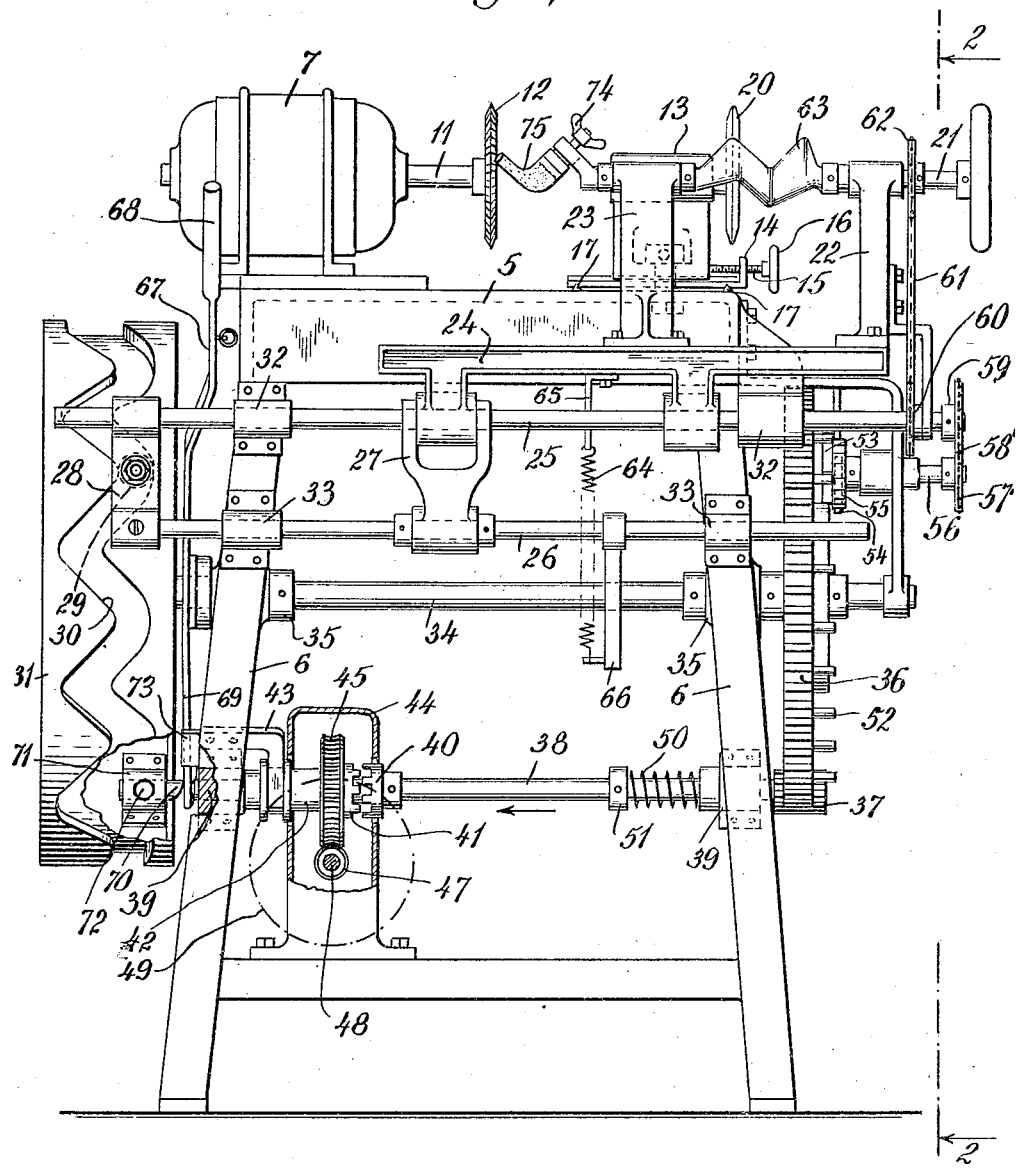

In the machine as hereinafter described the cutting is accomplished by moving the block which is supported in a suitable chuck successively across the edge of the cutting wheel, the arbor which supports the chuck being turned successively at the completion of each pass to bring a fresh surface into contact with the cutting wheel. The number of passes may vary depending upon the character of the work to be accomplished, from fifteen to thirty passes being suitable for most kinds of work with an average of from twenty to twenty-four passes. To accomplish the purpose of the invention it is necessary to provide for the reciprocation of the arbor and also for the intermittent rotation thereof, and in addition the machine as hereinafter described is arranged to stop automatically when the cut is completed, that is to say, when the arbor carrying the chuck has made a complete rotation so that every portion of the block has been subjected to the action of the cutting wheel.

In the preferred embodiment of the invention the arbor carrying the chuck and model is mounted upon a swinging frame which is pivoted on a reciprocating shaft and normally held by a spring so that the model remains always in contact with a fixed guide. The shaft bearing the pivoted frame is reciprocated by means of a rotating cam and the arbor is rotated intermittently through a pawl and ratchet mechanism which is correlated with the cam so that the arbor is turned through a slight angular distance at the end of each reciprocating stroke of the frame upon which the arbor is supported. The cam is driven from any suitable source of power but preferably from an electric motor, and a clutch is provided which permits the mechanism to become disengaged automatically from the motor upon the completion of each revolution of the cam.

In operating the mechanism as so far described, the operator places the block in the chuck whereby it is held securely in proper position with reference to the cutting wheel so that as the arbor advances with the model in engagement with the guide the block will be cut to a shape conforming to the model in a line extending from one end of the block to the other. When the operator has positioned the block in the chuck he operates a hand lever which permits the clutch to engage with the driving mechanism, thus starting the machine. The rotation of the cam immediately advances the arbor toward the cutting wheel with the result hereinbefore indicated. As the arbor approaches the end of its stroke the ratchet is actuated through mechanism hereinafter described to rotate the arbor through a portion of a revolution. The cam then moves the frame bearing the arbor in the opposite direction to make a new cut. The operation is repeated until the cam has made a complete revolution whereupon the clutch is automatically disengaged and the machine stops. The operator, who in the meantime may have fitted blocks in other machines, returns and removes the pipe bowl from the machine and substitutes a block therefor. He then throws the hand lever and leaves the machine to continue the operation.

An important feature of the present machine is the angularity of the axis of the pipe bowl with respect to the plane of the cutting wheel. In the hand-operated machines which have been used heretofore the axis of the pipe bowl was disposed at an angle of approximately 33° to the plane of the cutting wheel. It is possible to support the block in this angular relation in a hand-operating machine because the operator can feel the cutting wheel and guide the work accordingly. In the automatic machine the pipe bowl cannot be disposed at the same angle because the operation then becomes irregular and the bowl is gouged and torn by the cutting wheel. I have discovered, however, that if the bowl is so disposed that its axis is at an angle of approximately 45° to the plane of the cutting wheel the operation will proceed smoothly and the results obtained are as good or better than those secured in hand-operated machines.

Referring to Figs. 1 to 3 of the drawing, the machine comprises a bed 5 mounted on supporting legs 6. A motor 7 is mounted on the bed and is adjustable transversely thereof by screws 8 having operating handles 9, the screws being mounted in a bracket 10 at the rear of the bed. The motor 7 has a shaft 11 which carries a cutting wheel 12. The position of the cutting wheel can be adjusted by manipulation of the screws 8 for the purpose of properly aligning the mechanism.

A bracket 13 is mounted to slide on a support 14 upon which it may be adjusted by screws 15 having operating handles 16. The support is in turn mounted on guides 17 on the bed 5 and is adjustable thereon by means of screws 18 having operating handles 19. This arrangement permits the adjustment of the bracket 13 both longitudinally and transversely of the bed. The bracket carries a guide 20 corresponding to the cutting wheel 12.

An arbor 21 is supported by brackets 22 and 23 on the frame 24 which is in turn pivotally mounted on a shaft 25 which extends longitudinally of the bed and is connected with a rod 26 by a bracket 27 and by a cross-head 28 bearing a roller 29 which operates in a groove 30 in the face of a cam 31. The shaft 25 and the rod 26 are supported in bearings 32 and 33 on the bed 5 and legs 6 of the machine.

The cam 31 is mounted on a shaft 34 which is supported in bearings 35 on the legs 6. The shaft carries a gear 36 which meshes with a pinion 37 on a shaft 38, likewise supported in bearings 39 on the legs 6. The shaft 38 carries a clutch 40 which is adapted to mesh with a corresponding clutch 41 on a sleeve 42. The sleeve is mounted on the shaft 38 and is held by a bracket 43 in fixed position with reference to a housing 44 which encloses a worm wheel 45 on the sleeve. The worm wheel 45 meshes with a worm 47 on a shaft 48 of a motor 49, an electric motor being preferably employed. The shaft 38 is moved longitudinally in its bearings to permit the clutch 40 to engage the corresponding clutch 41. A spring 50 surrounding the shaft between the bearings 39 and a collar 51 on the shaft tends to hold the clutch in engagement so that the shaft is driven from the motor 49. When the shaft is thus rotated the gear 36 and cam 31 are likewise rotated, the machine being then in operation.

The gear 36 carries a plurality of equally spaced pins 52 which, as the gear rotates, are adapted to engage successively a ratchet bar 53 pivoted in a bracket 54 on the bed of the machine. The ratchet bar carries a pawl 54' which is adapted to engage a ratchet wheel 55 on a shaft 56. A spring 57 normally holds the ratchet bar 53 in position for contact by the pins 52 which, however, are permitted to pass as the pawl is actuated. A spring 58 holds the pawl in engagement with the ratchet wheel 55. A shaft 56 carries a sprocket 57' which is connected by a chain 58' to a sprocket 59 on the shaft 25. A similar sprocket 60 on the shaft 25 is connected by a chain 61 to a sprocket 62 on the arbor 21. The relation of the pins 52 on the gear 36 to the groove 30 in the cam 31 is such that one of the pins 52 engages the ratchet bar 53 each time the shaft 25 completes its reciprocating stroke in each direction. Consequently when the arbor 21 has been moved forwardly through a complete stroke to carry the pipe block across the face of the cutting wheel, one of the pins 52 will, through the ratchet mechanism, rotate the arbor 21 so that as the arbor returns a new surface is presented to the cutting wheel.

A model 63 is removably supported on the arbor 21 so as to permit variation of the forms to be cut from the pipe blocks. The model can be removed and another model can be substituted therefor. Thus, the pipe bowl can be given any desired shape. The model 63 is resiliently held in contact with the guide 20 by a spring 64 which is secured to a bracket 65 on the frame 24 and to a bracket 66 on the rod 26. Thus, as the arbor reciprocates the model 63 slides over the guide 20 and determines the position of the block with reference to the cutting wheel 12. The depth of the cut and consequently the shape of the finished bowl is determined by the form of the model used.

Referring to Figs. 4 to 7 inclusive the starting and stopping of the machine are governed by a lever 67 having a handle 68 which is pivoted on the shaft 34 and has a flexible end 69 which is adapted to be interposed between the end of the shaft 38 and a pin 70 which is adjustably mounted in a guide 71 on the cam 31. The position of the pin 70 is fixed by a screw 72. Fig. 5 represents the position of the parts when the machine is at rest, the end 69 of the lever being positioned between the end of the shaft 38 and the pin 70 so that the clutch 40 is disengaged from the clutch 41. A bracket 73 is provided to limit the movement of the lever in one direction. When the operator wishes to start the machine he grasps the handle 68 and moves the end 69 of the lever to the position indicated in Fig. 6, thus permitting the spring 50 to shift the shaft 38 longitudinally and cause engagement between the clutches 40 and 41. If the motor 49 is in operation the engagement of the clutches immediately starts the machine and causes rotation of the cam 31. At the end of a complete revolution the pin 70 engages the end 69 of the lever and moves it into contact with the bracket 73 in the position indicated in Fig. 7. The cam continues to rotate until the pin 70 flexes the end 69 of the lever and forces the shaft 38 to the right, viewing Fig. 7, when it assumes the position shown in Fig. 5. The clutches are then disengaged and the machine stops. The operator may then release the chuck by operating a wing nut 74, remove the bowl 75 and substitute a new block.

Throughout the operation as described the operator need give no attention to the machine. He may, therefore, devote his attention to a number of machines, introducing new blocks and removing the bowls as each machine stops at the completion of the cutting operation. An operator may easily handle three such machines which thus saves the labor of at least two men. Furthermore, the operator of the automatic machine need have no special skill as the cutting is controlled entirely by the mechanism, the only function of the operator being to feed the material and start the machine by the movement of the lever provided for that purpose. The pipe bowls cut by the automatic machine are usually superior to those made on hand-operated machines because the number of cuts is predetermined and fixed whereas the operator, particularly on piece-work, is inclined to reduce the number of cuts and thus to produce imperfect bowls. The advantages of the automatic machine include, therefore, the saving in labor, the saving in material, and the improved quality of the product.

While the mechanism as described is that which I have found best adapted to the accomplishment of the purpose, it is possible to introduce numerous variations of the structure and to modify the operation thereof without departing from the invention or sacrificing any of its advantages.

I claim:—

1. In a machine for shaping stock into tobacco pipes, the combination of a cutting wheel, a rotatable arbor, a holder on the arbor adapted to hold that portion of the stock which is to form the bowl of the pipe at an angle of approximately 45° to the plane of the cutting wheel, a model on the arbor, a guide against which the model rests, automatic means to reciprocate the arbor in the direction of its axis and to intermittently rotate it, and power means adapted to be connected to actuate the automatic means.

2. In a machine for shaping stock into tobacco pipes, the combination of a cutting wheel, a rotatable arbor, a holder on the arbor adapted to hold the work, a model on the arbor, a guide against which the model rests, power means, a cam connected to said power means, said cam having a plurality of irregularities, means operable by said cam for giving the arbor a reciprocation for each irregularity, means correlated with said cam to give the arbor a partial rotation for each reciprocation and means to disconnect the power means when the arbor has completed a revolution.

In testimony whereof I affix my signature.

ROLAND EDWARD WEINERT.